United States Patent
Dhake et al.

(10) Patent No.: US 12,090,925 B2
(45) Date of Patent: Sep. 17, 2024

(54) METHOD AND DEVICE FOR MONITORING THE SOILING OF SURFACES OF A VEHICLE

(71) Applicant: Ford Global Technologies, LLC, Dearborn, MI (US)

(72) Inventors: Abhinav Dhake, Aachen (DE); Rainer Vogt, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 17/736,293

(22) Filed: May 4, 2022

(65) Prior Publication Data

US 2022/0371511 A1 Nov. 24, 2022

(30) Foreign Application Priority Data

May 18, 2021 (DE) .......................... 102021112787.4

(51) Int. Cl.
*B60Q 9/00* (2006.01)
*G08B 21/18* (2006.01)

(52) U.S. Cl.
CPC ............... *B60Q 9/00* (2013.01); *G08B 21/18* (2013.01)

(58) Field of Classification Search
CPC ............ B60Q 9/00; G08B 21/18; B60S 1/56; B60S 1/64; A61L 2/10; A61L 2/24; G02B 27/0006; A81L 2202/14
See application file for complete search history.

(56) References Cited

U.S. PATENT DOCUMENTS

| | | | |
|---|---|---|---|
| 10,507,763 B2 | 12/2019 | Park et al. | |
| 10,773,690 B2 | 9/2020 | Dellock et al. | |
| 11,001,270 B2 * | 5/2021 | Dakemoto | ............. B60S 1/486 |
| 2015/0180471 A1 * | 6/2015 | Buttolo | ................ B60R 16/005 |
| | | | 307/116 |
| 2018/0101826 A1 * | 4/2018 | Hultermans | ........... G06Q 10/20 |
| 2018/0143298 A1 * | 5/2018 | Newman | .................. A61B 5/08 |
| 2018/0348509 A1 * | 12/2018 | Carpenter | ............... A61L 2/232 |
| 2019/0001930 A1 * | 1/2019 | Dellock | .................... A61L 2/10 |

(Continued)

FOREIGN PATENT DOCUMENTS

| | | |
|---|---|---|
| DE | 10126050 A1 | 12/2002 |
| DE | 102013001332 A1 | 7/2014 |

(Continued)

*Primary Examiner* — Steven Lim
*Assistant Examiner* — Son M Tang
(74) *Attorney, Agent, or Firm* — Vichit Chea; Price Heneveld LLP

(57) ABSTRACT

A method for operating a vehicle having at least one surface region designed to come into direct contact with a user, and at least one sensor to register a direct contact between the at least one surface region and the user. The method includes registering the beginning of a use of the vehicle by the user, registering direct contacts of the user with the at least one defined surface region by using the at least one sensor, registering the end of the use of the vehicle by the user, evaluating the registered direct contacts of the user with the at least one surface region, wherein the surface region is classified with respect to a potential degree of soiling of the surface region caused by the direct contacts during the use, and outputting a notification on the potential degree of soiling of the surface region.

20 Claims, 5 Drawing Sheets

(56) References Cited

U.S. PATENT DOCUMENTS

| | | | | |
|---|---|---|---|---|
| 2019/0091738 A1* | 3/2019 | Chen | .................. | B60H 1/00742 |
| 2020/0061223 A1* | 2/2020 | Hallack | ..................... | A61L 2/28 |
| 2020/0331435 A1* | 10/2020 | Dingli | ....................... | B60S 1/56 |
| 2020/0391702 A1* | 12/2020 | Yamauchi | ................ | B60Q 9/00 |
| 2021/0350689 A1* | 11/2021 | Kelly | ................... | G08B 21/245 |
| 2022/0250589 A1* | 8/2022 | Schmalenberg | .......... | B60S 1/64 |
| 2023/0126753 A1* | 4/2023 | Kikuma | .................... | A61L 2/24 |
| | | | | 422/28 |

FOREIGN PATENT DOCUMENTS

| | | | |
|---|---|---|---|
| DE | 102014017616 | A1 | 6/2016 |
| DE | 102019207527 | A1 | 11/2020 |
| DE | 102020004783 | A1 | 11/2020 |
| DE | 102019208871 | A1 | 12/2020 |

\* cited by examiner

METHOD AND DEVICE FOR MONITORING THE SOILING OF SURFACES OF A VEHICLE

CROSS-REFERENCE TO RELATED APPLICATION

This application claims foreign priority benefits under 35 U.S.C. § 119(a)-(d) to German Patent Application No. 102021112787.4 filed on May 18, 2021, which is hereby incorporated by reference in its entirety.

FIELD OF THE DISCLOSURE

The present disclosure generally relates to a method for operating a vehicle and a device for monitoring the potential or possible contamination of surfaces of a vehicle by users.

BACKGROUND OF THE DISCLOSURE

The regular usage of a vehicle for daily concerns typically results in the contact of the user with various surfaces in the interior of a vehicle, such that the vehicle cabin may potentially need to be cleaned. This may occur particularly if a vehicle is used by various users, for example in conjunction with car sharing.

Cleaning of the cabin may be desirable to remove obvious dirt, and also to remove microorganisms from the affected surfaces. In the context of cleaning, the surfaces frequently touched by users are typically cleaned. Nonetheless, certain regions may not be as obvious to clean.

With car sharing, it is desirable for a vehicle cabin to be in a cleaned state for a large number of users. In particular, it may not be sufficient to leave the cleaning of the vehicle surfaces to the individual experience and intuition of a user. Rather, it is desirable to communicate the regions to be cleaned to a user in a suitable manner.

It would be desirable to provide an advantageous device and method for operating a vehicle, which contributes in particular to ensuring cleaned interior surfaces of the vehicle.

SUMMARY OF THE DISCLOSURE

According to a first aspect of the present disclosure, a method for operating a vehicle having at least one surface region, which is designed to come into direct contact with a user, and at least one sensor, which is designed to register a direct contact between the at least one surface region and the user is provided. The method includes the steps of registering a beginning of a use of the vehicle by the at least one user, and registering the direct contacts of the at least one user with the at least one defined surface region by using the at least one sensor. The method also includes the steps of registering an end of the use of the vehicle by the at least one user, evaluating the registered direct contacts of the at least one user with the at least one surface region, wherein the surface region is classified with respect to a potential degree of soiling of the surface region caused by the direct contacts during the use, and outputting a notification on the potential degree of soiling of the surface region.

According to a second aspect of the present disclosure, a device for monitoring a potential soiling of surfaces of a vehicle which has at least one sensor which is designed to register a direct contact between at least one surface and a user, and an evaluation unit. The device is designed to perform a method including the steps of registering a beginning of a use of the vehicle by at least one user, registering the direct contacts of the at least one user with the at least one defined surface region by using the at least one sensor, and registering an end of the use of the vehicle by the at least one user. The method also includes the steps of evaluating the registered direct contacts of the at least one user with the at least one surface region, wherein the surface region is classified with respect to a potential degree of soiling of the surface region caused by the direct contacts during the use, and outputting a notification on the potential degree of soiling of the surface region.

According to yet another aspect of the present disclosure, a vehicle which comprises at least one surface which is designed to come into direct contact with a user is provided. The vehicle includes registering a beginning of a use of the vehicle by at least one user, registering the direct contacts of the at least one user with the at least one defined surface region by using the at least one sensor, and registering an end of the use of the vehicle by the at least one user. The vehicle also includes evaluating the registered direct contacts of the at least one user with the at least one surface region, wherein the at least one surface region is classified with respect to a potential degree of soiling of the at least one surface region caused by the direct contacts during the use and outputting a notification on the potential degree of soiling of the at least one surface region.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
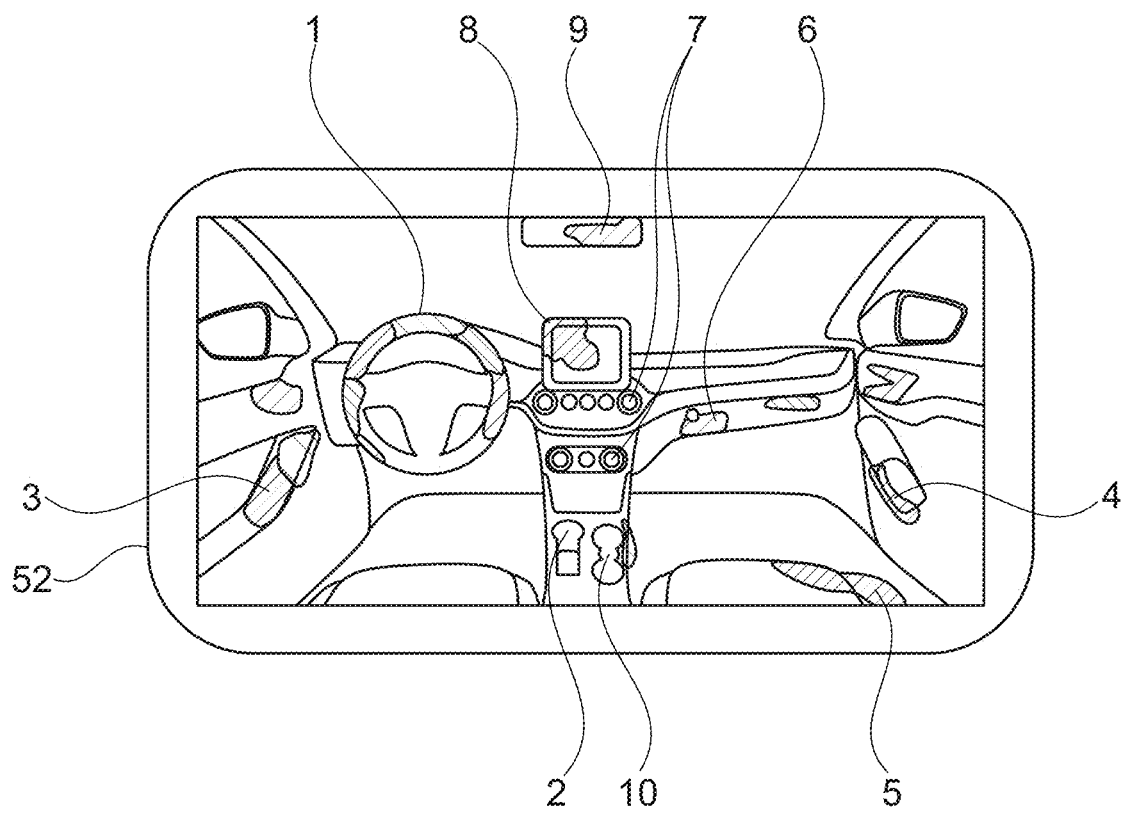
FIG. 1 is a schematic view of a display, on which a subsection of an interior of a passenger motor vehicle is depicted.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a method and device for monitoring the soiling of surfaces of a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIG. 1, a display 52 is shown, on which a subsection of an interior of a passenger vehicle is depicted. The interior comprises a number of surface regions, which are designed to be touched directly by a user. These include in particular the steering wheel 1, which in the embodiment shown has a number of surface regions, which differ in the frequency by which they are touched directly by a user. Further surface regions are located in the region of a shift lever 2, in the region of door handles 3 and 4, wherein a driver-side door handle is identified by the reference sign 3 and a passenger-side door handle is identified by the reference sign 4. Further surface regions are located in the region of a seat 5, a glove compartment 6, in the region of operating elements 7, in particular for climate control system, radio, navigation device, window opener, etc. In this case, a display having touchscreen is identified by the reference sign 8. A further surface region identified in the embodiment shown is located in the region of the rearview mirror 9.

A camera system (not shown in FIG. 1) arranged inside the vehicle cabin is used to monitor activities inside the cabin. The at least one camera tracks the surface regions with which the current user has come into direct contact and generates a historical database of the surface regions which are in need to be cleaned specifically for a following user. Regions which are frequently touched by a user, for example, the steering wheel, door handles, etc., are known contact surfaces, whereas other surfaces, for example in the region of the cupholder 10, the glove compartment, etc. represent regions which are used more or less specifically by user and/or usage.

The frequency of the contact of a user with individual surface regions decides the determined necessity and/or the extent of required cleaning of these surface regions. A single camera or a plurality of cameras, for example, an arrangement which comprises multiple cameras, can moreover be used, for example, to monitor the second and/or third row in addition to the front row of seats. The camera and/or an evaluation unit, possibly with assistance of object recognition software, can preferably develop a contour depiction of the touched surface regions. An interior map, for example, an infection map, can be compiled therefrom. This can take place in real time during the monitoring of the vehicle cabin and can be displayed on a display screen inside the vehicle or communicated to a user by using an LED-based illumination or by speech instructions, preferably before the user leaves the vehicle used.

The extent of the touches which occurred and the determined possible contamination and/or soiling of the vehicle surfaces possibly caused in this case can be indicated by a color scheme. This can be carried out by using a display or a display screen, for example, a central display screen arranged on the center console. The display can correspond to the image shown in FIG. 1. The individual marked surface regions 1 to 10 can be marked using different colors, wherein the individual colors correspond to different classifications of the surface regions with respect to their possible degree of soiling.

Figure 2:
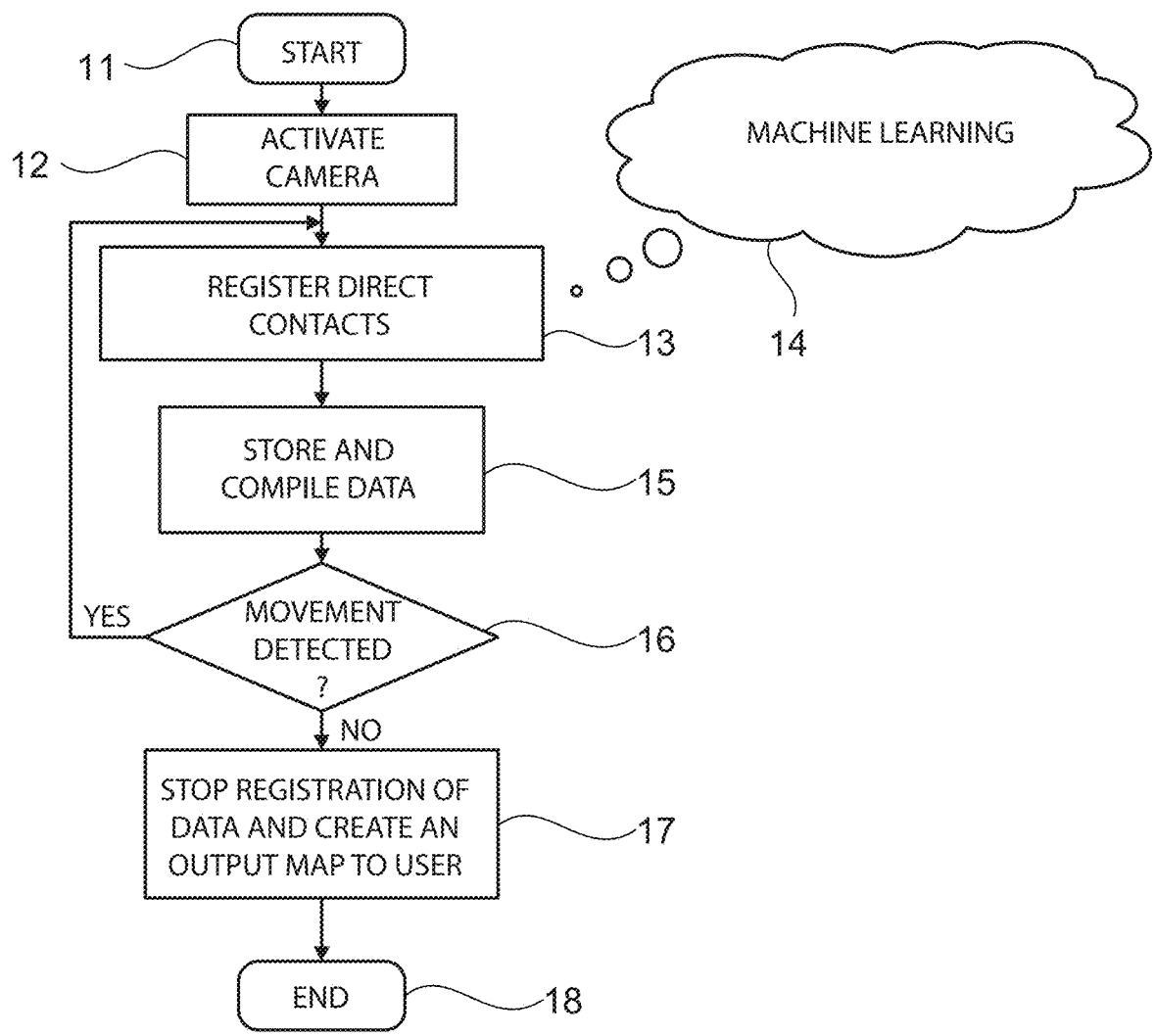
FIG. 2 is a flow diagram illustrating a method of operating a vehicle, according to one embodiment.

A first embodiment of a method according to the disclosure is explained in more detail in FIG. 2. FIG. 2 shows a corresponding method in the form of a flow chart. The method starts with block 11. Subsequently, in step 12, a camera system is activated and the beginning of a use is registered. In step 13, the direct contacts of the user with a defined surface region of the vehicle cabin are registered and evaluated by use of an evaluation unit, for example, a computer present in the vehicle. Optionally, indicated by the reference sign 14, alternatively or additionally algorithms based on machine learning can be used here, in particular to achieve better accuracy of the judgment. The algorithms can be stored and/or executed in a cloud.

Following step 13, in step 15, data on the surface regions with which a contact has taken place are stored in a database and preferably compiled in the form of a map. The data comprise features of the direct contacts of a user with the individual surface regions which are registered and/or evaluated for individual surface regions and their classification with respect to a potential degree of soiling caused by the direct contacts during the use.

In step 16, it is subsequently checked whether a movement is still detected inside the vehicle cabin. If this is the case, the method thus jumps back to step 13. If this is not the case, in step 17, the registration of data is stopped and a vehicle interior map is created based on the registered data and output to a user. This can take place, for example, via a direct illumination of individual surface regions and/or by a corresponding display on a display screen. The method ends with block 18.

A control method for a display system is explained hereinafter in FIG. 3 in the form of a flow chart. The control method is based on registered movements inside the vehicle cabin. If a movement has been detected, the image processing is started and details are registered which are compared to a snapshot of prior timestamps. Noise can be suppressed by use of filtering and various backgrounds and foregrounds can be distinguished from one another to classify individual vehicle components which have come into direct contact with a user. The classified components or surface regions inside the vehicle cabin are stored to create a map. At the end of the use, a confirmed list can be displayed on a display screen of the vehicle or in another form and communicated to a user. This can also take place, for example, by using mobile devices, speech outputs, illumination, etc. The image recognition can be based on neural networks, in particular neural networks designed for deep learning, which can improve the classification in the course of time.

Figure 3:
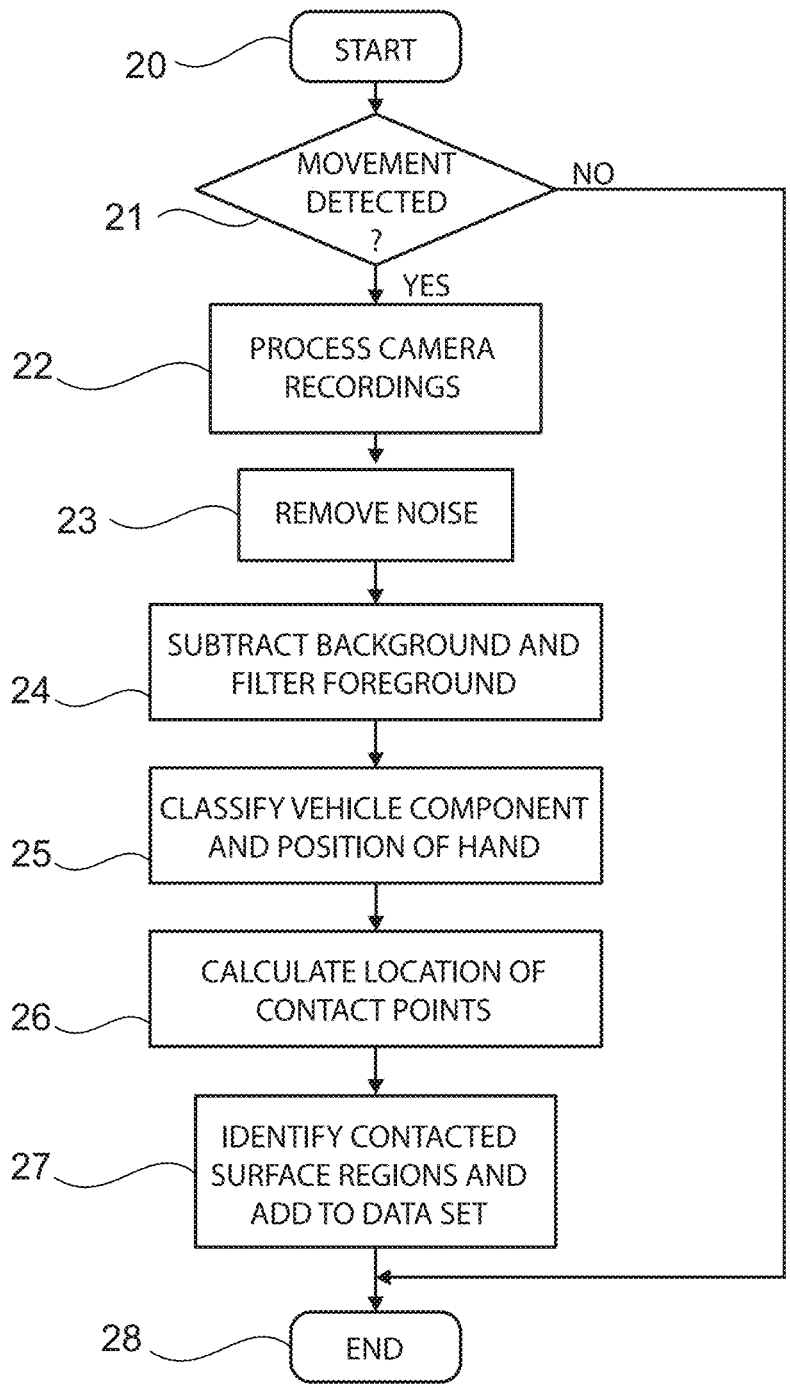
FIG. 3 is a flow diagram illustrating a control method for a display system, according to one embodiment.

The control method is shown in FIG. 3 and starts with block 20. In step 21, it is checked whether a movement is detected inside the vehicle. If this is not the case, the method thus ends. If this is the case, in step 22, image processing of registered camera recordings is performed, wherein image details are extracted. For this purpose, successively recorded images are compared to one another. Subsequently, in step 23, noise is removed from the extracted images. In step 24, the background is subtracted and the foreground is filtered. In step 25, the vehicle component, in particular a defined surface region, is classified, as is the position of a detected hand of a user. Subsequently, in step 26, the location of the contact points between a user, in particular a hand of a user, and defined surface regions is calculated. In step 27, the contacted surface regions are identified and added to a data set for confirmation at the end of the use. The method ends with block 28.

The communication of contaminated or potentially soiled surface regions inside the vehicle to a user can also take place by using a light-emitting diode (LED) light illumination system or a laser pointer system, which is designed to illuminate or irradiate the affected surface regions. Corresponding lighting elements of the illumination system can be integrated into a guide rail or into the roof or arranged fastened thereon. One example of this is shown in FIG. 4.

Figure 4:
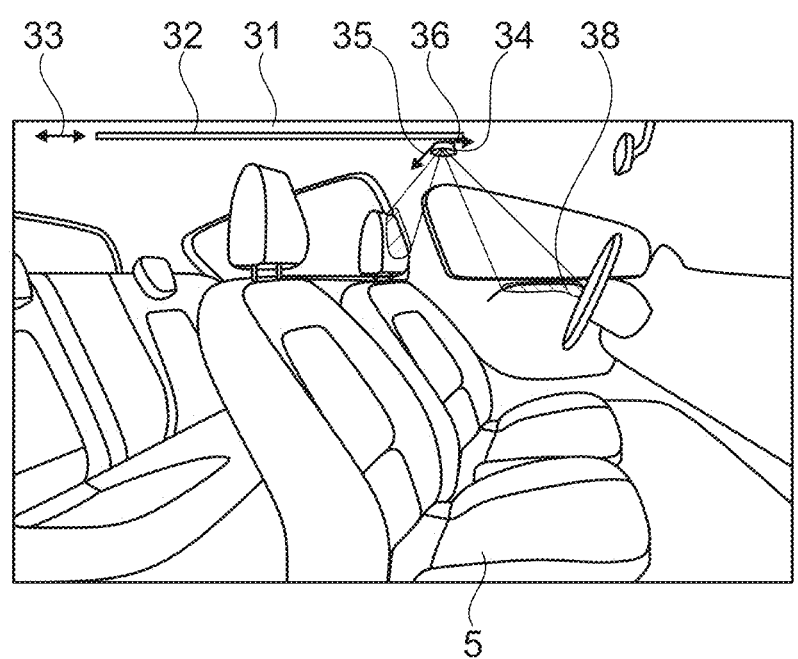
FIG. 4 is a side perspective view of the interior of a passenger motor vehicle illustrating lighting for communicating soiled surface regions.

FIG. 4 schematically shows one example of the interior of a motor vehicle 50. The roof 31 of the interior has a guide rail 32, which is arranged in the longitudinal direction of the motor vehicle 50 on the roof. A number of lighting elements 34, for example in the form of (LEDs) or a laser system, are arranged on this guide rail 32. The individual lighting elements 34 are arranged so they are axially movable along the guide rail 32 along a longitudinal direction 33 and/or rotatable around at least one axis, for example around an axis of rotation in the direction of the arrow 35 and/or the arrow 36. In this way, a large number of affected surface regions can be illuminated and irradiated using a small number of lighting elements 34. A corresponding guide rail system enables a movement of the individual lighting elements 34 along the at least one guide rail 32.

The extent of a required cleaning or a corresponding degree of soiling can be identified according to a defined classification by using different colors. For example, by use of a first color, for example red, a high degree of soiling can be identified, by use of a second color, for example yellow-orange, a lesser degree of soiling can be identified, and use of a third color, for example blue, a lesser degree of soiling can be identified. Of course, any other color combinations and other numbers of classification gradations are possible.

The above-mentioned rotational mechanisms increase the degrees of freedom for the respective illumination unit and improve the precision of the illumination of the relevant surface regions inside the vehicle. The individual lighting elements 34 can be moved and/or rotated in a motorized manner along guide rails 32. Illuminated surfaces are identified in the example in FIG. 4 with the reference signs 37 and 38.

An alternative illumination system can be implemented by usage of LEDs, which are arranged in the immediate vicinity of an observation camera, thus the sensor. The LED beams can be aligned in the direction of the respective surfaces 37, 38. Rotatable mirrors can be used for the respective alignment of the beam. By way of this solution, the exact surfaces can be reached which were also monitored by the respective sensor, for example, the camera, and the data of which are stored in the above-mentioned map. The illumination, in particular the color of the respective surface illumination, can take place in accordance with a defined color code, as described above.

In an expansion, the camera system or a corresponding sensor system can check whether the user or another person has sufficiently cleaned the vehicle interior, so that a following user finds a satisfactorily cleaned vehicle. This can be judged by the sensor system used and similarly to the above-described method. It can be taken into consideration in particular how much time was used for cleaning a specific surface or a surface region, which pressure was exerted on the surface during the cleaning process, and/or by a comparison of image recordings before and after the cleaning, etc. A real-time check can register the time which is required and was used to clean correspondingly identified surface regions. The corresponding color indication can disappear as soon as the corresponding surface has been sufficiently cleaned. The current user can then receive a rating based on the satisfactory performance of the cleaning. If the user is not careful and leaves the vehicle without a corresponding cleaning, this can thus have a negative effect on his rating. In this way, a high standard of a vehicle fleet with regard to defined hygienic standards can be achieved and ensured.

Figure 5:
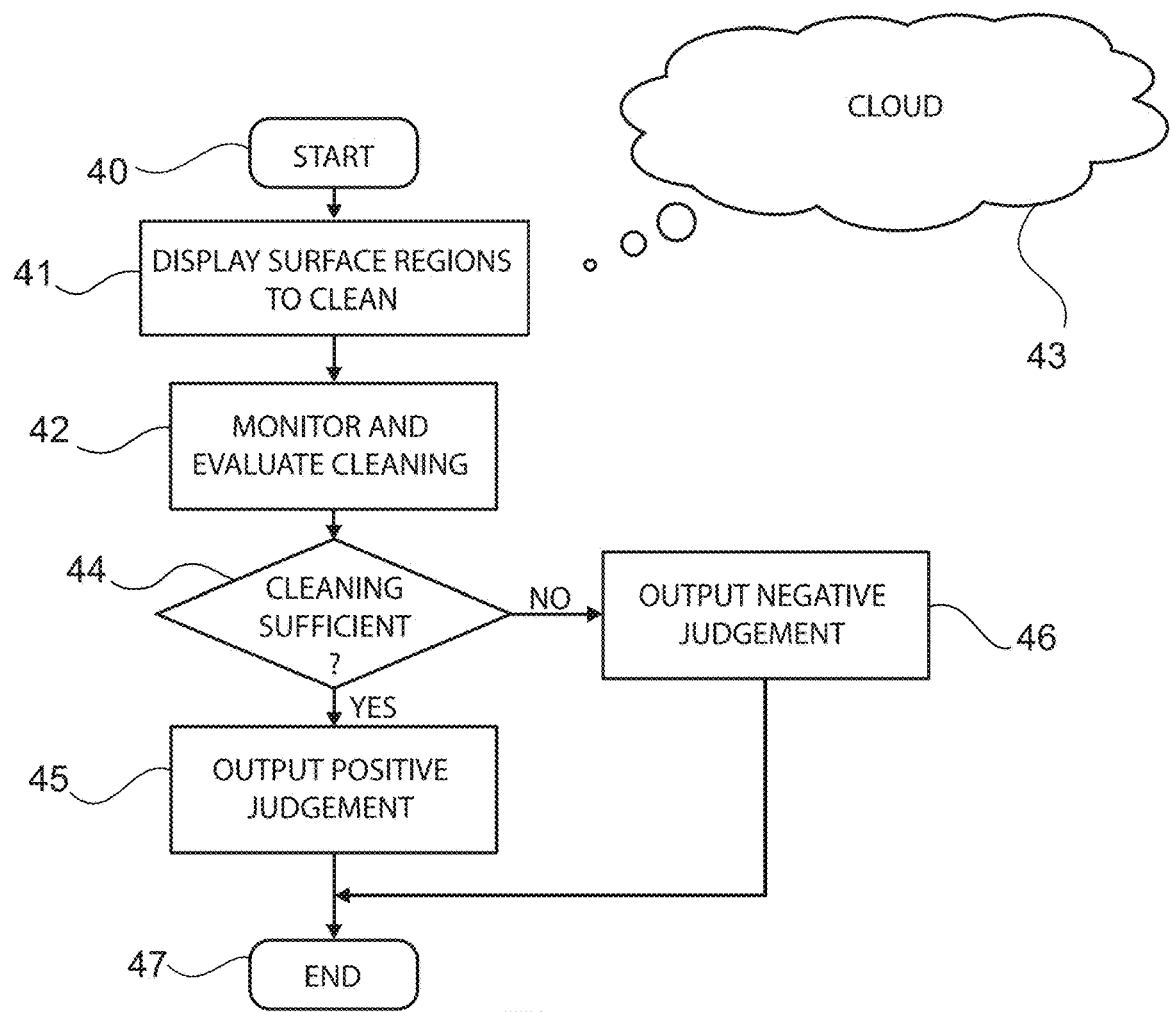
FIG. 5 is a flow diagram illustrating an example for a routine for checking a cleaning process.

FIG. 5 shows an example of a routine for checking a cleaning process. The method starts with block 40. In step 41, the surface regions which are to be cleaned are displayed to a user. This can take place, as already described above, by use of a display screen and/or by irradiating the corresponding surface regions. In step 42, the cleaning carried out by a user is monitored and evaluated by use of an onboard computer. In this case, indicated by the reference sign 43, cloud-based algorithms designed for machine learning can be applied. In step 44, it is checked whether the cleaning is sufficient. If this is the case, in step 45, a positive judgment of the user is output. If this is not the case, in step 46, a negative judgment is output. Following step 45 or step 46, the method ends with block 47.

Figure 6:
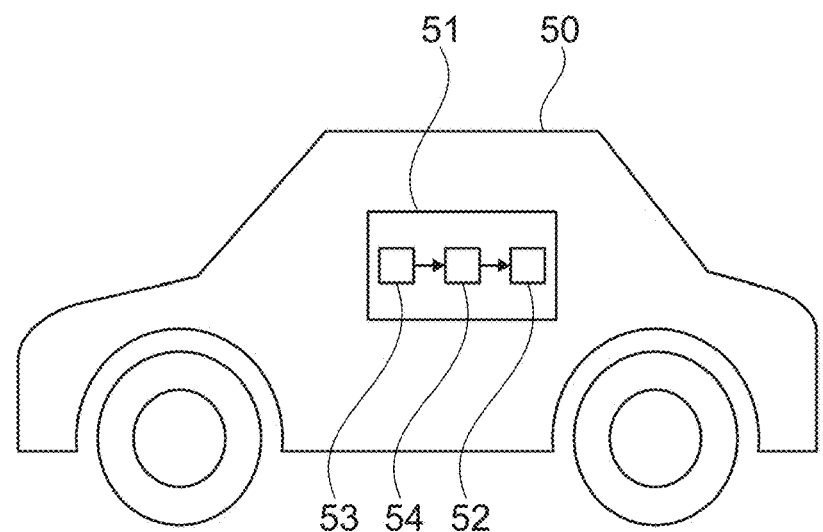
FIG. 6 is a schematic diagram illustrating a vehicle having a device for monitoring potential soiling of surfaces, according to one embodiment.

FIG. 6 schematically shows a vehicle, for example, a motor vehicle. The vehicle 50 comprises a device 51 that comprises at least one sensor 53, for example, a camera, wherein the sensor 53 is designed to register a direct contact between at least one surface of the interior of the vehicle 50 and a user. The device 51 additionally comprises an evaluation unit 54, which is designed to receive signals from the sensor 53 and output signals at an HMI 52, for example, a display. The device 51 is designed to carry out a method according to the invention, for example, a method described on the basis of the example shown in FIGS. 2, 3, and 5.

The disclosure provides a method for operating a motor vehicle, a device for monitoring the potential soiling of surfaces of a vehicle, and a computer-implemented method.

The method for operating a vehicle relates to a vehicle which comprises at least one surface region, which is designed to come into direct contact with a user. The vehicle additionally comprises at least one sensor, which is designed to register a direct contact between the at least one surface region and a user. The vehicle can be, for example, a motor vehicle, a rail vehicle, a ship, or an aircraft.

The method comprises the following steps: the beginning of a use of the vehicle by at least one user is registered. In a next step, the direct contacts of the at least one user with the at least one defined surface region are registered. Further, the end of the use of the vehicle by the at least one user is registered. The registered direct contacts of the at least one user with the at least one surface region are evaluated during the use, from the registered beginning of the use until the registered end of the use. The surface region is classified with respect to a potential degree of soiling of the surface region caused by the direct contacts during the use. In a further step, a notification is output to the user on the potential degree of soiling of the surface region.

Current and/or subsequent users can thus be made aware of potentially unhygienic and/or unclean regions in the interior of the vehicle. This can be carried out by auditory signals and/or by corresponding light spots. A corresponding illumination can additionally help to indicate potentially unhygienic regions which are not visible to the naked eye. The output notification can be perceptible visually and/or acoustically. In one embodiment, the output of a notification comprises a colored illumination of the at least one defined surface region as a function of the potential degree of soiling. This can be implemented, for example, by means of multicolor LEDs. Additionally or alternatively thereto, the affected surface regions and their classification can be displayed by use of a display screen to the user.

The method has the advantage that the potential degree of soiling is individually ascertained for individual surface regions and it is displayed to the user which surface regions are to be cleaned with which intensity or thoroughness. In this way, it can be ensured easily and reliably that after the end of use, the surfaces actually to be cleaned are thoroughly cleaned. Cleaning costs are reduced and at the same time the efficiency of the cleaning is improved. A check of the cleaning procedure can also be enabled for following users. Overall, the cleanliness, in particular the hygienic standard, of vehicles which are used by multiple users is significantly improved by the method and the transparency in this regard is increased.

In one exemplary embodiment, individual potential degrees of soiling can be or become coded using a defined color scheme. For example, surface regions which are stressed particularly strongly by direct contacts and are therefore possibly strongly soiled can be illuminated using light of a first color, for example using red light, surface regions which are touched less and are therefore possibly less soiled can be illuminated using light of a second color, for example using green light, and surfaces only made use of slightly during the use can be illuminated using light of a third color, for example using blue light. Further gradations and the use of further colors are obviously possible. The different-colored illumination of the individual surface regions according to their potential degree of soiling has the advantage that cleaning of the affected surfaces can be performed deliberately and efficiently.

A camera and/or a temperature sensor and/or a motion detector can be used as the sensor, for example. Multiple sensors are advantageously used, for example, multiple cameras, etc.

In one advantageous embodiment, at least one feature of the direct contacts of a user with the at least one defined surface region during the use is registered and evaluated. The number and/or the duration of the direct contacts of a user with the at least one defined surface region during the use can be registered and evaluated as the feature. If a camera is used as the sensor, suitable object recognition software can be used. Additionally or alternatively thereto, individual images recorded in chronological succession can be compared to one another in the context of the evaluation. Defined features of the direct contacts can be ascertained by a corresponding image comparison, for example in conjunction with object recognition.

The beginning and/or the end of a use of the vehicle by a user can be registered by an input by the user and/or by registering the actuation, for example the opening and/or the closing, of a door of the vehicle and/or by registering the starting of a motor of the vehicle.

In a further embodiment, a map of the defined surface regions can be output, wherein the classification of the individual surface regions is identified. This can be carried out, for example, by a multicolor depiction, a diagram, or the like via a display or a display screen. Furthermore, a database can be created, which comprises the frequency of the direct contacts of a user with the defined surface regions.

In this context, for example, a cleaning profile for the specific vehicle and/or a user-specific profile can be created and in this way efficient cleaning of the vehicle following use can be ensured.

The notification output to a user preferably comprises a communication of a potential soiling and/or contamination of individual surface regions. Additionally or alternatively thereto, the notification output to a user can comprise instructions or suggestions for cleaning individual surface regions. The type of a required cleaning and suitable cleaning device or process can be specified here, for example. Furthermore, individual surface regions to be cleaned can be identified, preferably in a visually perceptible manner, preferably by an above-described targeted illumination of the relevant surface regions.

In a further particularly advantageous embodiment of the present disclosure, in addition to ascertaining the degree of soiling of individual surface regions, the quality of a subsequent cleaning thereof can also be ascertained. In this embodiment, in the scope of the method, an input prompt is output at the beginning of a cleaning to a user. This can take place, for example, at the beginning of a use or at the end of a use of the vehicle. In a next step, a user input to begin a cleaning is received, for example by an evaluation unit. The user input can take place via a human-machine interface (HMI). Subsequently, for at least one defined surface region, at least one feature of a cleaning process is registered by usage of the at least one sensor. The at least one feature of the cleaning process can be the duration of the cleaning process and/or an intensity of the cleaning process derived from physical parameters of the cleaning process. It can be registered, for example, whether the cleaning is carried out in a wet and/or dry manner and/or which cleansers and/or cleaning devices were used.

The at least one registered feature is evaluated, wherein the cleaning process is classified as a function of the at least one registered feature. In a next step, the classification of the cleaning process for the at least one defined surface region is output to a user. This can take place in a visually and/or acoustically perceptible manner. Displays or display screens present in the vehicle can be used for this purpose. However, as already described above, the corresponding surface regions can also be illuminated in colors. A defined color scheme depicting the classification of the cleaning can be used here. For example, completely cleaned surface regions can be illuminated using a first color and surface regions which are not completely cleaned, thus are still to be cleaned again, can be illuminated using a second color. Surface regions to be cleaned again can also be identified in another way, of course.

In a further embodiment of the method, an input prompt can be output to a user at the end of the cleaning. The user is thus in other words prompted to perform an input when he or she is finished with the cleaning. In a next step, a user input is received at the end of a cleaning, preferably by an evaluation unit by use of an HMI. Subsequently thereto, the above-described output of the classification of the cleaning process of the at least one defined surface region to the user can take place. Corresponding feedback to the user on the respective current classification can thus already be given during the cleaning process and/or a corresponding output can take place at the end of a cleaning after a corresponding user input in this regard. The classification of the cleaning process at the end of a cleaning can be stored so it is visible to subsequent users. Additionally or alternatively thereto, a user-specific classification of the entire cleaning process can be performed from the classification of the cleaning process of the at least one defined surface region and stored in a user-specific manner and possibly used for a user ranking.

The above-described embodiments have the advantage that the quality of the cleaning carried out by a prior user and/or a cleaning company is transparent to following users. This advantageously contributes to improved cleanliness of vehicles, particularly those vehicles used by a large number of users.

The device for monitoring a potential soiling of surfaces of a vehicle relates to a vehicle which comprises at least one sensor, which is designed to register a direct contact between at least one surface and a user. The device additionally comprises an evaluation unit and is designed to carry out an above-described method according to the disclosure. The sensor can comprise a camera and/or a temperature sensor and/or a motion detector. The device can furthermore comprise a unit for identifying a classification of individual defined surface regions. This can be a display and/or at least one illumination unit, which is designed to illuminate, in particular irradiate, defined surface regions using light of a plurality of different colors. The unit for identifying a classification preferably comprises a number of LEDs. The described device has the features and advantages already mentioned in conjunction with the method according to the disclosure.

The vehicle comprises at least one surface which is designed to come into direct contact with a user, and an above-described device according to the disclosure. The vehicle can be a motor vehicle, a rail vehicle, a ship, or an aircraft. The motor vehicle can be a passenger vehicle, a truck, a minivan, or an omnibus. An illumination unit for identifying individual surface regions can be attached in the region of the vehicle roof of the vehicle cabin. Guide rails and light guides can be used here. The vehicle according to the disclosure has the above-mentioned features and advantages.

The computer-implemented method comprises commands, which, upon the execution of the program by a computer, cause it to carry out the steps of an above-described method according to the disclosure. The computer program product comprises commands, which, upon the execution of the program by a computer, cause it to carry out the steps of an above-described method according to the disclosure. A computer program product is stored on the computer-readable data carrier according to the disclosure. The data carrier signal transfers the computer program product according to the disclosure. The computer-implemented method, the computer program product according to the disclosure, the computer-readable data carrier and the data carrier signal have the above-described features and advantages.

In principle, machine learning methods, in particular evaluation units and/or camera systems having machine learning algorithms, can be used in the scope of the present disclosure.

The method, device and vehicle disclosed herein contributes overall to improving the trust of users in the cleanliness and hygiene of the vehicle cabin of a vehicle, in particular a vehicle used by a large number of users.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for operating a vehicle having at least one surface region, which is designed to come into direct contact with a user, and at least one sensor, which is designed to register a direct contact between the at least one surface region and the user, the method comprising the steps of:
    registering a beginning of a use of the vehicle by the at least one user;
    registering the direct contacts of the at least one user with the at least one defined surface region by using the at least one sensor;
    registering an end of the use of the vehicle by the at least one user;
    evaluating the registered direct contacts of the at least one user with the at least one surface region, wherein the surface region is classified with at least three levels of soiling with respect to a potential degree of soiling of the surface region caused by the direct contacts during the use; and
    outputting a notification on the potential degree of soiling of the surface region, wherein the output of the notification comprises illuminating with a number of lighting elements the at least one defined surface region with a colored illumination with at least three colors that vary according to the at least three levels of soiling, and wherein the number of lighting elements are arranged on the vehicle and are moveable to different positions.

2. The method according to claim 1, wherein the at least one sensor comprises a camera and/or a temperature sensor and/or a motion detector.

3. The method according to claim 1, wherein at least one feature of the direct contacts of the at least one user with the at least one defined surface region during the use is registered and evaluated.

4. The method according to claim 3, wherein as the at least one feature, a number and/or the duration of the direct contacts of the at least one user with the at least one defined surface region during the use are registered and evaluated.

5. The method according to claim 1, wherein the beginning and/or the end of a use of the vehicle by a user are registered by an input by the at least one user and/or by registering the actuation of a door of the vehicle and/or by registering the starting of a motor of the vehicle.

6. The method according to claim 1 further comprising outputting a map of the defined surface regions, wherein the classification of the individual surface regions is identified.

7. The method according to claim 1 further comprising creating a database, which comprises a frequency of the direct contacts of a user with the defined surface regions.

8. The method according to claim 1, wherein the notification output comprises a communication of a potential soiling of individual surface regions and/or instructions for cleaning individual surface regions and/or an identification of individual surface regions to be cleaned.

9. The method according to claim 1, wherein an input prompt is output to a user at the beginning of a cleaning, a user input at the beginning of a cleaning is received, subsequently, for at least one defined surface region, at least one feature of a cleaning process is registered by using the at least one sensor, the at least one registered feature is evaluated, wherein the cleaning process is classified as a function of the at least one registered feature, and the classification of the cleaning process of the at least one defined surface region is output to a user.

10. The method according to claim 1, wherein the method is performed by a computer executing a computer program generating command.

11. A device for monitoring a potential soiling of surfaces of a vehicle which has at least one sensor which is designed to register a direct contact between at least one surface and a user, and an evaluation unit, wherein the device is designed to perform a method comprising the steps of:
    registering a beginning of a use of the vehicle by at least one user;
    registering the direct contacts of the at least one user with the at least one defined surface region by using the at least one sensor;
    registering an end of the use of the vehicle by the at least one user;
    evaluating the registered direct contacts of the at least one user with the at least one surface region, wherein the surface region is classified with at least three levels of soiling with respect to a potential degree of soiling of the surface region caused by the direct contacts during the use; and
    outputting a notification on the potential degree of soiling of the surface region, wherein the output of the notification comprises illuminating with a number of lighting elements the at least one defined surface region with a colored illumination with at least three colors that vary according to the at least three levels of soiling, and wherein the number of lighting elements are arranged on the vehicle and are moveable to different positions via at least one of a guide rail and rotation about an axis.

12. The device according to claim 11, wherein the sensor comprises a camera and/or a temperature sensor and/or a motion detector.

13. The device according to claim 11 further comprising a unit for identifying a classification of individual defined surface regions, wherein the device outputs a map of the defined surface regions, and wherein the classification of the individual defined surface regions is identified.

14. The device according to claim 11, wherein the method is performed by a computer executing a computer program generating command.

15. A vehicle which comprises at least one surface which is designed to come into direct contact with a user, the vehicle comprising:
    registering a beginning of a use of the vehicle by at least one user;
    registering the direct contacts of the at least one user with the at least one defined surface region by using the at least one sensor;
    registering an end of the use of the vehicle by the at least one user;
    evaluating the registered direct contacts of the at least one user with the at least one surface region, wherein the at least one surface region is classified with at least three levels of soiling with respect to a potential degree of soiling of the at least one surface region caused by the direct contacts during the use; and
    outputting a notification on the potential degree of soiling of the at least one surface region, wherein the output of the notification comprises illuminating with a number of lighting elements the at least one defined surface region with a colored illumination with at least three colors that vary according to the at least three levels of soiling, and wherein the number of lighting elements are arranged on the vehicle and are moveable to different positions via at least one of a guide rail and rotation about an axis.

16. The vehicle according to claim 15, wherein the vehicle is designed as a motor vehicle, rail vehicle, ship, or aircraft.

17. The vehicle according to claim 15, wherein the method is performed by a computer executing a computer program generating command.

18. The vehicle according to claim 15 further comprising outputting a map of the defined surface regions is output, wherein the classification of the individual surface regions is identified.

19. The vehicle according to claim 1, wherein the number of lighting elements are moveable on a guide rail.

20. The vehicle according to claim 1, wherein the lighting elements are rotatable about an axis.

* * * * *